E. F. BERRY.
COUPLING.
APPLICATION FILED JUNE 15, 1915. RENEWED OCT. 4, 1916.
1,233,169.
Patented July 10, 1917.
2 SHEETS—SHEET 1.
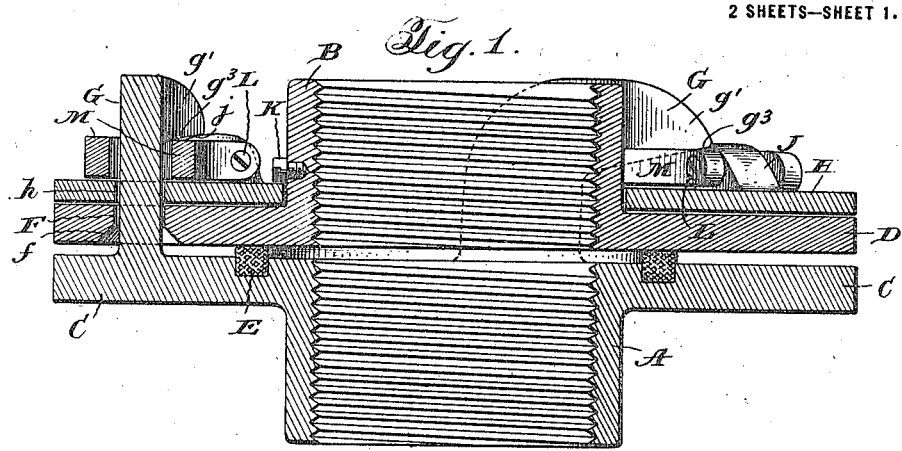
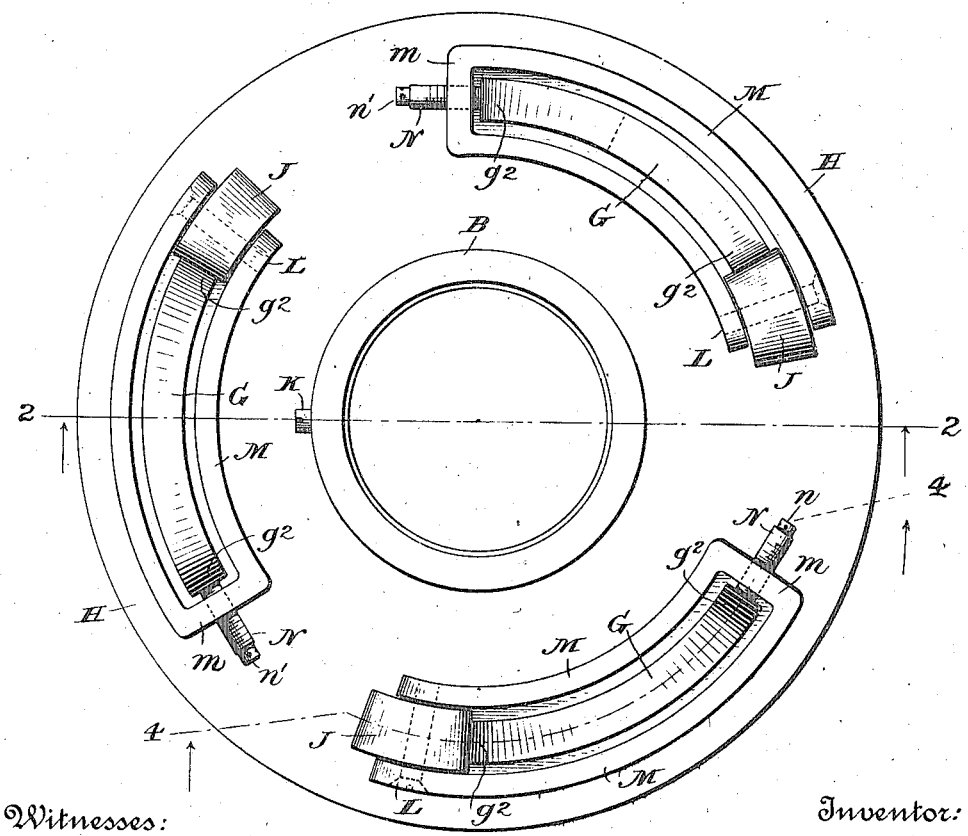

E. F. BERRY.
COUPLING.
APPLICATION FILED JUNE 15, 1915. RENEWED OCT. 4, 1916.
1,233,169.
Patented July 10, 1917.
2 SHEETS—SHEET 2.
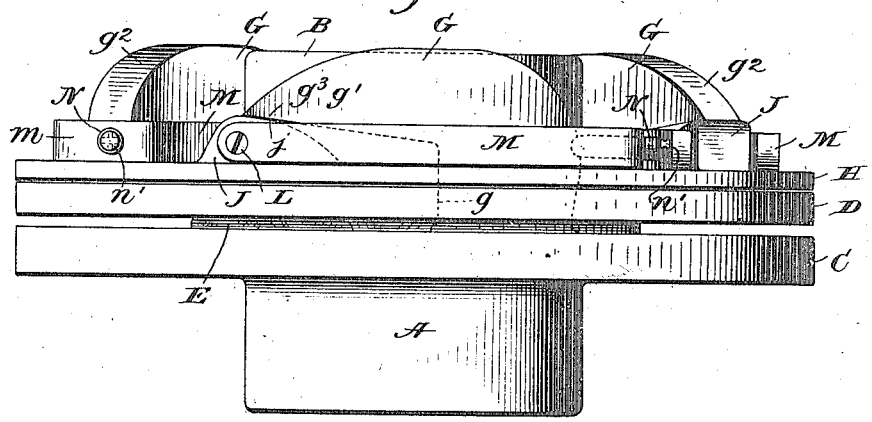
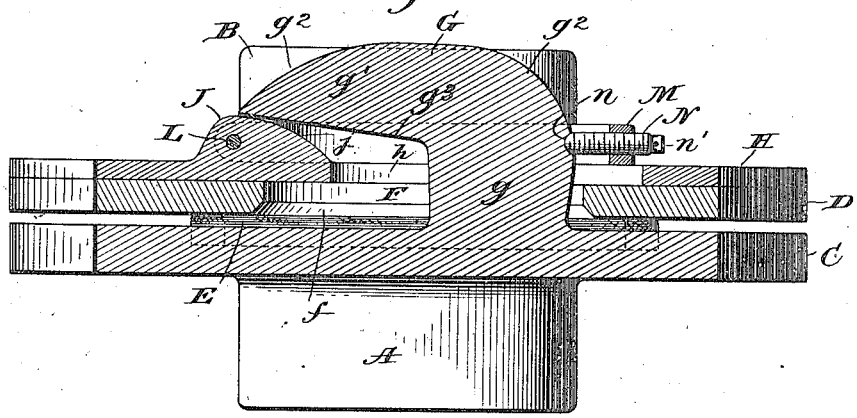

UNITED STATES PATENT OFFICE.

EDWARD F. BERRY, OF NEW ORLEANS, LOUISIANA.

COUPLING.

1,233,169.  Specification of Letters Patent.  Patented July 10, 1917.

Application filed June 15, 1915, Serial No. 34,199. Renewed October 4, 1916. Serial No. 123,764.

*To all whom it may concern:*

Be it known that I, EDWARD F. BERRY, a citizen of the United States, residing at New Orleans, in the parish of Orleans and State of Louisiana, have invented certain new and useful Improvements in Couplings, of which the following is a specification, reference being had therein to the accompanying drawing.

This invention comprises improvements in couplings, capable of various uses, as will be apparent to persons skilled in the art to which the invention pertains.

An object of the invention is to provide an improved simple coupling means, particularly useful in expeditiously securing the members to be coupled in closed relation; preferably without the use of rivets or bolts; and the same, in combination with means for locking the parts in assembled relation.

More specifically, the invention embraces a coupling including interfitting wedge parts adapted, when relatively turned, to draw the members together, and means for positively forcing said relative turning movement to correspondingly more effectively secure the mutual operation of the wedge parts for the purposes stated, as well as to lock the parts against accidental separation.

Improved details in the construction and arrangement of parts will be apparent from the specific description hereinafter contained, when read in connection with the accompanying drawings forming parts hereof, in which, Figure 1 is a sectional view through the pipe coupling;

Fig. 2 is a plan view showing the manner of passing the wedge lugs through the clamping ring just prior to the turning of the ring and the screwing up of the locking means.

Fig. 3 is a side elevation; and

Fig. 4 is a longitudinal sectional view of Fig. 3 on a line through a pair of wedge parts, the wedge ring being here shown as turned into clamping position with the locking means screwed home.

Referring more specifically to the drawings, wherein like reference letters designate corresponding parts in the several views, A and B represent respectively, oppositely disposed coupling members, adapted to be secured to adjoining ends of a pair of pipe sections desired to be united together.

The coupling members A and B, having outwardly extending flanges C and D between which a suitable packing ring E of fibrous rubber or other suitable composition carried by one of the flanges and projecting therewithout to engage the surface of the opposing flange is interposed to secure a sealing engagement where desired.

The flange D has a suitable number of slots F therein concentrically arranged, as shown in Fig. 2, having outwardly flaring or tapered edge walls $f$ for a purpose as will presently appear.

The other flange C carries a series of wedge lugs G having neck portions $g$, and heads $g'$, beveled on their under surfaces, said heads being rounded at their ends, as at $g^2$, to facilitate the insertion thereof through the slotted portions F, the flaring mouths $f$ of the slots assisting in the operation just referred to.

Loosely overlying the flange D, is a flat ring H provided with slots $h$, through which the lugs G also pass, said ring carrying outwardly projecting curved wedges J, corresponding in number to the wedge lugs G and having inclined faces F', adapted to be engaged by the inclined under edges $g^3$ of the heads of the lugs G, so that upon turning of the ring, the two coupling members A and B are tightly drawn together and the surfaces thereof forced into abutting relation. The ring H is held against displacement on the coupling member B by a set screw K engaging the coupling member B.

To secure a positive turning movement of the ring H with its wedges beneath the beveled heads of the wedge lugs G, I pivotally secure at L, to either one or more of the lugs J, a clamping bail M, the arms of which are adapted to receive therebetween the curved coöperating lugs J and G when engaged,—the bail being curved in keeping with the contour of the latter,—and the closed end $m$ of the bail being adapted to lie behind the wedge lug G, where a clamping bolt N, passing through said closed end of the bail, may engage the back of the lug and thus force the wedge parts together, this bolt constituting an effective lock to prevent separation or loosening of the parts. Where found desirable the back of the wedge lug G may be indented or recessed, as at $n$, for the reception of the end of the clamping bolt N to prevent slipping of the bail off the lug. The clamping bolts N are provided with perforated head portions n' through which any convenient implement may be inserted for turning the bolts, this arrangement being suitable for compactness and to facilitate turning of the bolt, while enabling close proximity of the latter to the ring H. Other forms of bolts and means for turning the same may of course be resorted to, where feasible.

From the foregoing description, it will be appreciated that in a simple and inexpensive manner I have provided a coupling which is readily detachable, but which at the same time may be quickly assembled and firmly locked together in a substantially permanent coupled position, as occasion may require.

While I have herein shown a number of the locking bails which will enable the manipulation of any one of the same in keeping with the convenience or position of the operator, and while all of the bails when secured in place will additionally lock the parts together, it will be understood that it is necessary only to provide a single bail or to clamp in place but one of the bolts to secure a practical operative combination.

It will also be appreciated that whereas I have herein disclosed a specific embodiment of my invention, the same is capable of embodiment in other forms and devices as may be in keeping with the hereto appended claims.

Having thus described the invention, what is claimed is:

1. The combination of members adapted to be coupled provided with a pair of relatively rotatable coöperating wedge parts, and adjustable means engaging one of the wedge parts to force the same into binding relation with the other wedge part, said adjustable means comprising a pivoted bail carried by one of the wedge parts, and a bolt associated with the pivoted bail adapted to engage the other wedge part.

2. The combination of members to be coupled, one carrying wedge portions and the other an apertured portion through which said wedge portions may project, a rotatable clamping ring carried by said last mentioned member through which said wedge portions may also project, said wedge portions having nose portions facing in a direction the reverse of the direction of rotation of the clamping ring, and said clamping ring having wedge portions facing in the direction of said rotation adapted to engage said nose portions, and means for locking the parts in coupled position comprising a member pivotally connected to a part that carries one of the wedge portions and adapted to be swung into holding relation with a part that carries an opposing wedge portion.

3. The combination of members to be coupled, one carrying wedge portions and the other an apertured portion through which said wedge portions may project, a rotatable clamping ring carried by said last mentioned member through which said wedge portions may also project, said wedge portions having nose portions facing in a direction the reverse of the direction of rotation of the clamping ring, and said clamping ring having wedge portions facing in the direction of said rotation adapted to engage said nose portions, and means for locking the parts in coupled position comprising a member pivotally connected to a part that carries one of the wedge portions and adapted to be swung into holding relation with a part that carries an opposing wedge portion, said locking means comprising a stirrup-like bail having its free ends constituting in part its pivotal connection and its closed end adapted to engage over the opposing wedge portion received therewithin, said closed end being provided with a part formed to impinge against the back of said opposing wedge portion.

4. The combination of members to be coupled, one of which has a flange provided with an opening and the other of which has a flange carrying a wedge lug, a coöperating wedge part on said first mentioned coupling member, and fastening means for drawing the wedge parts together the said fastening means offering no projections beyond the flange members, substantially as described.

5. The combination of members to be coupled, each carrying wedge portions adapted to coöperate by relative rotary movement in securing the members together, and means for locking the parts in coupled position comprising a member pivotally connected to a part that carries one of the wedge portions and adapted to be swung into holding relation with a part that carries an opposing wedge portion.

6. The combination of members to be coupled, one of which has a flange provided with an opening and the other of which has a flange carrying a wedge lug, a coöperating wedge part on said first mentioned coupling member, and adjustable means for drawing the wedge parts together, said last mentioned means comprising a member pivoted to one of the wedge parts and carrying a clamping device engaging the other wedge part.

7. The combination of members to be coupled, one of which has a flange provided with an opening and the other of which has a flange carrying a wedge lug, a coöperating wedge part on said first mentioned coupling member, and adjustable means for drawing the wedge parts together, said last mentioned means comprising a bail pivoted to one of the wedge parts and carrying a clamping device engaging the other wedge part.

8. The combination of members to be coupled, each carrying wedge portions adapted to coöperate by relative rotary movement in securing the members together, and means for locking the parts in coupled position comprising a member pivotally connected to a part that carries said locking means, and comprising a stirrup-like bail having its free ends constituting in part its pivotal connection and its closed end adapted to engage over the opposing wedge portion received there within, said closed end being provided with a part formed to impinge against the back of said opposing wedge portion.

9. The combination of members to be coupled, each carrying coöperating wedge parts, an adjusting means carried by one of the wedge parts and engaging the other to effect movement of the wedges in binding relation, said adjusting means being located within the area described by the outer margin of the coupling members.

10. The combination of members to be coupled, one provided with a flange having an opening therein and the other having a flange bearing a wedge part passing through the openings in the apertured flange, a coöperating wedge part carried by said first mentioned coupling member, and fastening means attached to said last mentioned wedge part and engaging the wedge part passing through the apertured flange for forcing said wedge parts into binding relation, the said fastening member being disposed circumferentially of the apertured flange.

11. The combination of members to be coupled, one provided with a flange having an opening therein and the other having a flange bearing a wedge part passing through the openings in the apertured flange, a coöperating wedge part carried by said first mentioned coupling member, and fastening means attached to said last mentioned wedge part and engaging the wedge part passing through the apertured flange for forcing said wedge parts into binding relation, the said fastening means being disposed circumferentially of the apertured flange and lying within the borders thereof.

12. The combination of members to be coupled, one provided with a flange having an aperture therein and the other having a flange bearing a wedge lug adapted to be inserted through said aperture, adjustable means carried by one of the wedge parts, and engaging the other wedge part to force the said wedge part into binding relation, the said adjustable means offering no projections beyond the flanges.

13. The combination of members adapted to be coupled carrying wedge portions adapted to coöperate by relative rotary movement in securing the members together, pivoted adjusting means carried by one of said wedge parts adapted to be thrown into position to engage a retaining portion on the other wedge part to effect a binding relation of the said wedge parts and normally prevent the disengagement of the adjustable means.

14. The combination of opposed coupling members, one of which has a flange provided with an opening and the other a flange carrying a wedge lug, the said wedge lug being provided at one side with a recessed engaging part, a coöperating wedge lug on said first mentioned coupling member, a pivoted adjusting means carried by one of the wedge members adapted to be thrown into position to have a portion thereof seated within the recess in the other wedge part to force the said wedge parts into binding relation, and normally prevent the disengagement of the adjustable means.

15. The combination of members to be coupled, a pair of coupling wedge parts, one carried by each of said coupling members, and longitudinally curved fastening means disposed circumferentially of one of the coupling members carried by one of the wedge parts, and engaging the other wedge part to bind the same together.

16. The combination of members to be coupled, having adjacent out-turned flanges, a pair of coöperating wedge parts carried thereby, adjusting means engaging one of the wedge parts to force the same into binding relation with the other wedge parts, said adjusting means being arranged within the borders of one of the out-turned flanges and comprising a pivoted member, and clamping devices associated with the pivoted member adapted to engage the other wedge part.

17. A pipe coupling comprising a pair of opposed coupling members, one carrying wedge lugs and the other an upturned flange, a circumferentially disposed clamping ring adjacent the flange and having wedge lugs thereon, and fastening means for said clamping ring secured to the wedge lug thereon and engaging the wedge lug passing through the apertured flange for drawing said wedge lugs tightly together.

18. The combination of members to be coupled, one carrying wedge lugs and the other an apertured flange, a clamping ring adjacent the flange and having wedge lugs thereon, and fastening means for said clamping ring secured to the wedge lug thereon and engaging the wedge lugs passing through the apertured flange for drawing said wedge lugs tightly together, the said fastening means being arranged within the borders on the operating flange.

19. The combination of members to be coupled, one provided with a flange having an aperture therein and the other having a flange bearing a wedge lug adapted to be inserted in said opening, in combination with a clamping ring associated with said first mentioned coupling member having a wedge secured thereto, and fastening means arranged parallel with one of the carrying members, comprising a bail attached to the wedge arranged on the clamping member and engaging the lugs passing through the apertured flange for drawing the said wedge lugs together.

20. The combination of relatively movable members to be coupled, one carrying wedge portions, and the other having apertured portions through which said wedge portions may project and also having surfaces with which the wedge portions may coact, said wedge portions having nose portions facing in line with the coupling movement, and means for locking the parts in coupled position comprising a member pivotally connected to the apertured member and adapted to be swung behind the nosed wedge portion and engage the latter, substantially as described.

21. The combination of relatively movable members to be coupled, one carrying wedge portions, and the other having apertured portions through which said wedge portions may project and also having surfaces with which the wedge portions may coact, said wedge portions having nose portions facing in line with the coupling movement, and means for locking the parts in coupled position comprising a member mounted on the face of the apertured member and adapted to engage behind the nosed wedge portion, substantially as and for the purpose described.

22. The combination of relatively movable members to be coupled, one carrying wedge portions, and the other having apertured portions through which said wedge portions may project and also having surfaces with which the wedge portions may coact, said wedge portions having nose portions projecting in line with the coupling movement, and means for locking the parts in coupled position comprising a member adapted to engage behind the nosed wedge portion, substantially as and for the purpose described.

In testimony whereof I hereunto affix my signature in the presence of two witnesses.

EDWARD F. BERRY.

Witnesses:
JOHN ALBION SAXTON,
E. MURPHY.